United States Patent [19]
Iarocci et al.

[11] 3,886,985
[45] June 3, 1975

[54] MULTIPLE TREE HARVESTER AND METHOD FOR HARVESTING TREES

[75] Inventors: Anthony Iarocci; William John Willows, Both of Brantford, Ontario, Canada

[73] Assignee: Koehring Canada Limited, Brantford, Ontario, Canada

[22] Filed: Apr. 5, 1974

[21] Appl. No.: 458,328

[52] U.S. Cl. ......... 144/309 AC; 144/3 D; 144/34 R; 214/147 G; 214/330; 294/106
[51] Int. Cl. ............................................. B27h 1/00
[58] Field of Search ......... 294/106; 214/147 C, 330; 144/2 Z, 3 D, 34 R, 34 E, 309 AC

[56] References Cited
UNITED STATES PATENTS

| | | | |
|---|---|---|---|
| 3,238,981 | 3/1966 | Larson et al. | 144/2 Z X |
| 3,363,929 | 1/1968 | Nelson | 294/106 X |
| 3,371,692 | 3/1968 | Larson et al. | 144/309 AC |
| 3,631,995 | 1/1972 | Jones | 294/106 X |
| 3,749,143 | 7/1973 | Hamilton | 144/3 D X |
| 3,795,264 | 3/1974 | Coughran, Jr. | 144/34 R X |
| 3,804,453 | 4/1974 | Walden | 294/106 X |
| 3,805,860 | 4/1974 | Smith | 144/309 AC |

*Primary Examiner*—Andrew R. Juhasz
*Assistant Examiner*—W. D. Bray
*Attorney, Agent, or Firm*—Andrew J. Beck

[57] ABSTRACT

A mobile harvester which is capable of shearing trees at their base, one at a time, and accumulating a plurality of trees, one at a time while the previously accumulated trees are rigidly held together, and subsequently delivering the accumulated trees to other areas, such as for example to a tree processing tower from which they are then deposited in a log cradle or other receptacle. The tree harvester apparatus includes a conventional, power operated shear blade mechanism which severs a tree adjacent its base, the blade mechanism also being operable to provide a support for the butt end of the plurality of severed trees. The harvester has tree gathering means located vertically above the shear blade mechanism and this gathering means includes two pairs of power operated arms which are movably mounted so that each pair of arms can be individually and selectively swung between an open, tree receiving position and a closed, tree holding position. The arrangement is such that one of the pairs of arms is utilized to hold the accumulated trees while the other pair of arms functions to grasp another subsequently severed tree and bring it into engagement with the previously accumulated tree or trees.

A method for accumulating a plurality of trees, one at a time, and which method includes selectively moving two pairs of power operated arms for gathering and holding accumulated trees.

19 Claims, 16 Drawing Figures

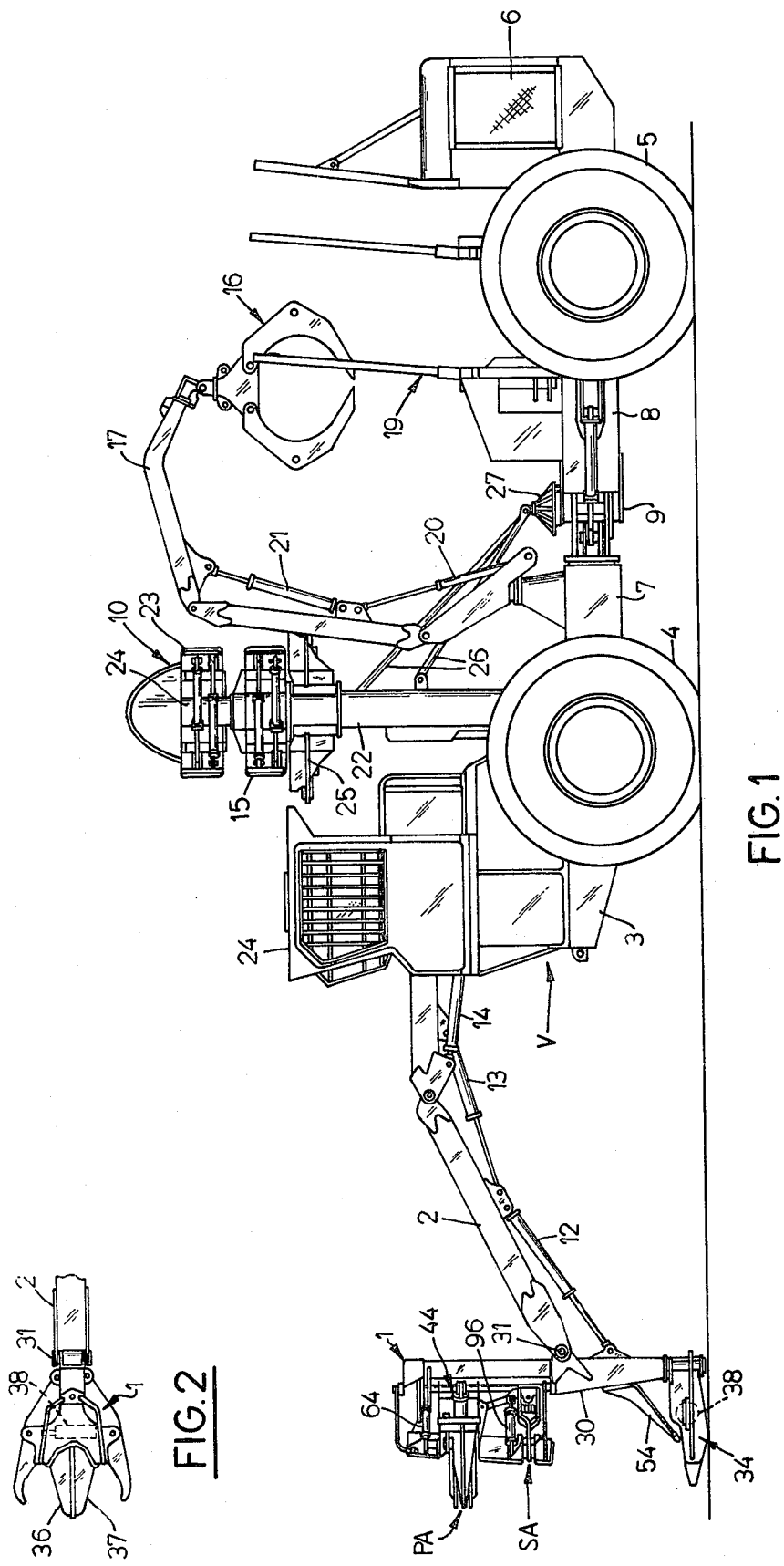

MULTIPLE TREE HARVESTER AND METHOD FOR HARVESTING TREES

BACKGROUND OF THE INVENTION

Various mobile tree harvesting devices have been proposed and used with a certain degree of success and these include harvesters for handling a plurality of trees. One of the shortcomings of these prior art devices however, resides in their inability to hold individual severed trees in a positive manner and at the same time, successively gather additional trees and bunch them together with the previously accumulated trees. One example of a prior art multiple tree harvester is shown in the U.S. Pat. No. 3,371,692 issued Mar. 5, 1968 to Larson et al. and entitled "Method for Harvesting Trees." That patent and its parent U.S. Pat. No. 3,238,981 show a device which encircles and tightly grips a plurality of trees about their upper portions to bring them into contact relationship with one another to form a cluster and then cutting those trees at their bases and continuing to grasp all of the trees and then clamping the trees adjacent the cut ends thereof and delimbing the cluster of trees. In other words, that harvester does not individually gather the trees and cannot hold the accumulated, cut trees while other individual trees are being gathered and cut and then bunched together with the previously accumulated trees.

Another example of a prior art, multiple tree harvester is shown in U.S. Pat. No. 3,795,264 issued Mar. 5, 1974 and entitled "Tree Accumulating Attachment for a Tree Harvester." That device shows an accumulator which has tree receiving means that permits the tree trunk to be advanced therethrough and which is detailed in dimension for engaging and retaining a plurality of tree trunks. That device however cannot positively hold the accumulated trees while the subsequent tree being gathered is positively grasped and held and then moved into engagement with the accumulated trees, while the accumulated trees are continued to be grasped in a secure manner.

SUMMARY OF THE INVENTION

The present invention provides a multiple tree harvester having two pairs of movably mounted arms for cooperating with one another to gather a plurality of trees, one at a time. The arrangement is such that both pairs of arms are movably mounted and power operated and movable to an open tree receiving position and a closed, tree holding position. The pairs of arms are selectively operated and move between the above mentioned tree receiving position and accumulated tree holding position, one pair of arms being operative to gather a tree while the other pair of arms securely holds the previously accumulated tree.

A more specific aspect of the invention relates to the feature of having one pair of arms shaped and mounted in such a way so as to be withdrawn generally laterally after that pair of arms has acted to clampingly hold accumulated trees together and the other pair of arms has then grasped a subsequent tree and urged it into contact with the backside of the one pair of arms. In this manner, the accumulated trees are always held firmly together while the one pair of arms can be easily moved generally laterally from their closed position in which they hold the accumulated trees and out of the way so that the second pair of arms can add a subsequent tree to the accumulated tree.

The present invention also provides a method for harvesting and accumulating a plurality of trees using two pairs of selectively operable arms.

These and other objects and advantages of the present invention will appear hereinafter as this disclosure progresses, refering being had to the accompanying drawings.

BRIEF DESCRIPTION OF THE DRAWINGS

FIG. 1 is a side elevational view of a tree harvester embodying the present invention;

FIG. 2 is a plan view of the cutting and gathering apparatus shown on the outer tree boom of the harvester shown in FIG. 1;

DESCRIPTION OF A PREFERRED EMBODIMENT

General

The present invention relates to a mobile tree harvester which is capable of accumulating a plurality of trees, one at a time, and which is also capable of securely holding all of the accumulated trees while additional trees are cut and gathered with the previously accumulated trees.

The invention includes the use of two pairs of power operated, movable arms, the pairs of arms being selectively and individually operable and movable between a tree receiving open position and a closed, tree holding position. One pair of arms acts to hold the accumulated trees and while the other pair of the arms acts to gather an additional tree and deliver it into engagement with the previously accumulated trees. Positive control of all of the trees at all stages of the operation is insured.

Figure 3:
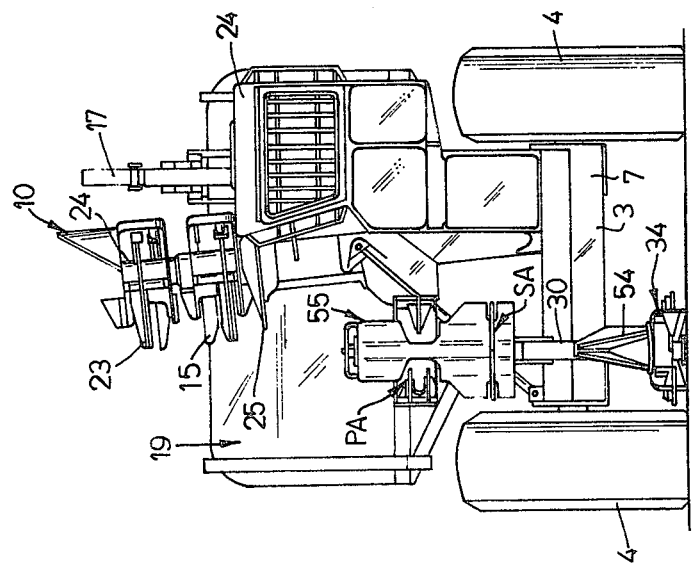
FIG. 3 is a front elevational view of the harvester shown in FIG. 1.

The mobile vehicle V shown in FIGS. 1 and 3 includes a tree cutting and gathering mechanism 1 located at the forward end of the tree boom 2 which in turn is pivotally attached to the main frame 3 of the vehicle so that the cutting and gathering mechanism 1 can be vertically positioned as well as swung in a generally horizontal direction. The vehicle itself is conventional in character, and is ground supported by the pairs of wheels 4 and 5, which receive their power in the conventional manner from a power source 6. The frame or chassis of the vehicle includes a front chassis portion 7 and a rear chassis portion 8 which are articulated about the vertical pivot 9.

The vehicle also includes a tree processing tower 10 extending upwardly and to which the cut, accumulated trees are conveyed by the cutting and gathering mechanism 1. For that purpose, suitable hydraulic cylinders 12, 13, and 14, for example, are used to vertically and horizontally position the mechanism 1 so as to be able to deliver the accumulated trees as a unit to the processing tower 10 and held by clamps 15.

The processing tower 10 includes a center mast 22 (FIG. 1) having a delimber 23 mounted on a telescoping inner member 24 within mast 22 so that the delimber can be vertically positioned and move upwardly over the tree being processed to remove the limbs and also perform a debarking function. The processing tower also includes a log shear 25 that acts to cut, i.e., "buck" the tree, if a bucking operation is to be performed, into proper lengths, say for example into 100-inch bolts. Otherwise the cut tree may be left in its full length.

The logs (bolts) are then delivered by the log guides 26 and cone-like transfer rollers 27 to the storage means which takes the form of a cradle 19. The load of cut bolts is built within the cradle from below.

Tree Accumulating Mechanism

Figure 16:
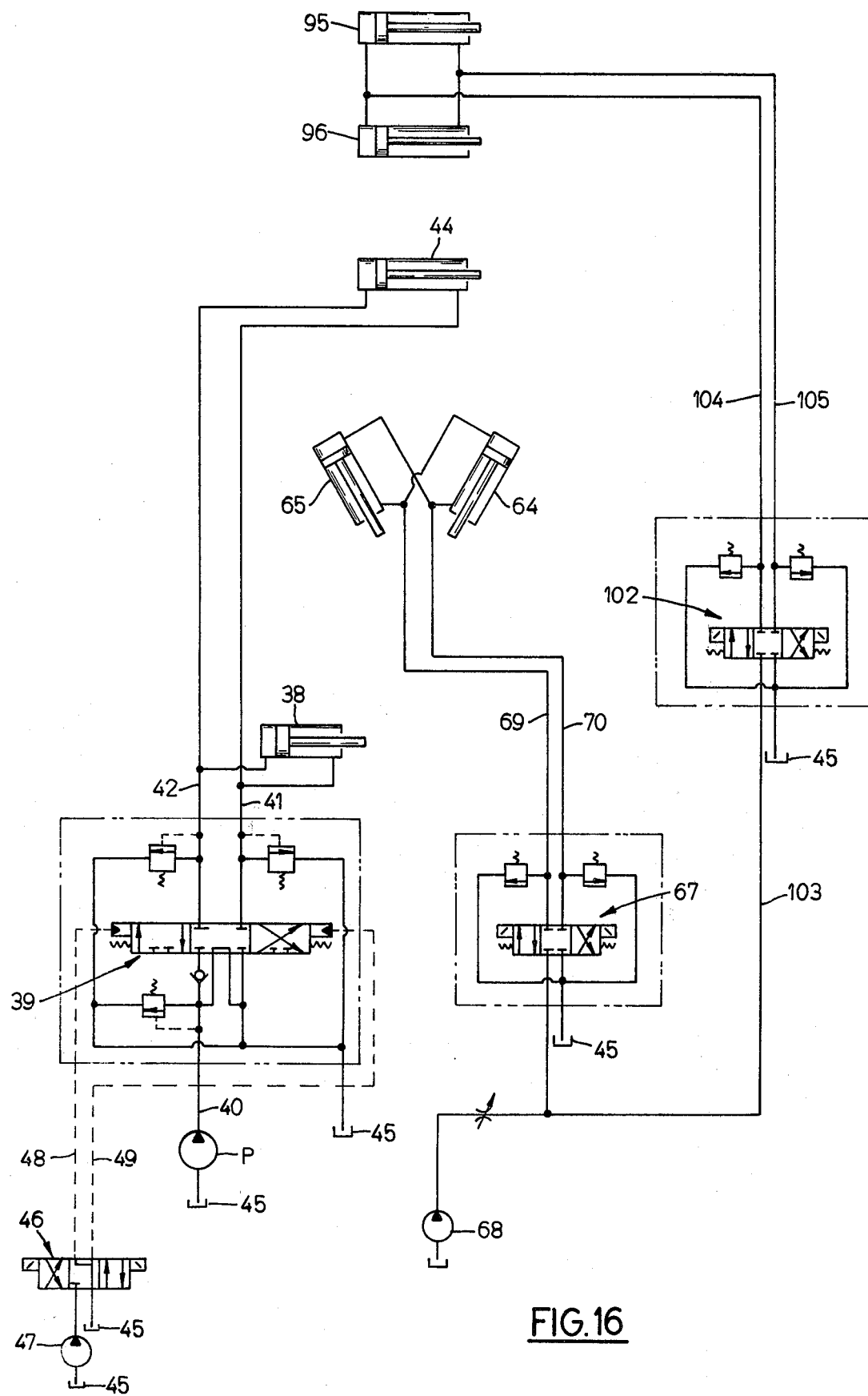
FIG. 16 is a hydraulic circuit used with the present invention.

Referring now in greater detail to the cutting and gathering mechanism 1, a vertically extending support frame 30 is pivotally attached at 31 to the outer end of the boom 2. The previously mentioned hydraulic cylinder 12 is connected between the boom 2 and the support frame 30 so as to swing the mechanism 1 about the pivot point 31. At the lower end of the frame 30, the power operated shear 34 is provided for shearing the trees adjacent the ground. As shown in FIG. 2, for example, the shear 34 includes the opposed blades 36 and 37 each of which are swingable between a closed position shown in FIG. 2 and the open position shown, for example, in FIG. 10. These blades are power operated by the hydraulically operated double acting cylinder unit 38 (FIGS. 1, 2 and 16) under the influence of a pilot operated control valve 39. Pressurized fluid is delivered from the pump P via conduit 40 (FIG. 16) through the shiftable valve 39 and through conduits 41 and 42 to the tree shear cylinder unit 38. Conduits 41 and 42 also extend to the primary tree clamp cylinder unit 44 for simultaneous actuation thereof. When the valve 39 is shifted to the left as viewed in FIG. 16, fluid pressure is released from the head end of the double acting cylinder units 38 and 44 and returned to the sump 45, and pressure fluid in conduit 41 then pressurizes the rod end of cylinder units 38 and 44. Conventional pressure relief valves are also provided in the circuit as indicated, but a description of them is not believed neccessary. The pilot operated valve 39 is shifted by the operator actuated, conventional pilot valve 46 which directs fluid pressure from a remote source 47 and through either conduit 48 or 49.

The shear unit 34 is stationarily mounted on the lower end of the support frame 30. Blades 36 and 37 are pivoted on shaft 51. A tree stop member 54 is provided directly above the blades 36 and 37 so that a tree to be severed abuts against the stop 54 as the blades 36 and 37 are closed under power by the shear cylinder unit 38.

At the upper end of the support frame 30, a subframe 55 is horizontally swingable about a vertical shaft 57 which is mounted in the upper portion of the support frame 30. The sub-frame 55 includes a series of vertically spaced and horizontally disposed plates 60, and 62 which are welded to the shaft 57. A pair of hydraulic cylinder units 64 and 65 (FIG. 4 and 16) are connected between the subframe 55 and the support frame 30 so that the entire sub-frame 55 and its associated pairs of arms, to be described, can be swung in a generally horizontal direction. A fluid flow control valve 67 directs pressure fluid from a constant pressure source 68 and through either of the conduits 69 or 70 so as to either selectively extend or contract the cylinder units 64 and 65, thus swinging the sub-frame 55 and its pairs of arms in a horizontal direction.

Figure 4:
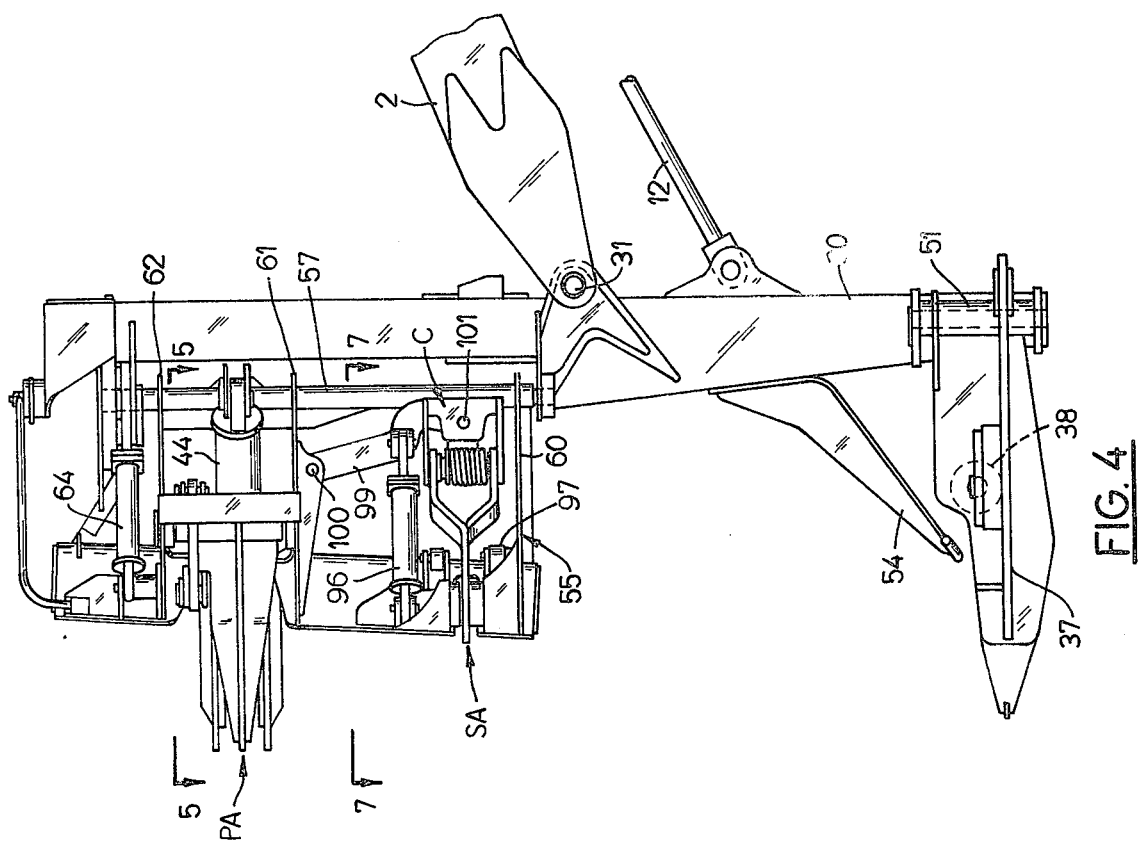
FIG. 4 is an enlarged side elevational view of the cutting and gathering apparatus shown at the front end of the vehicle in FIG. 1.
Figure 5:
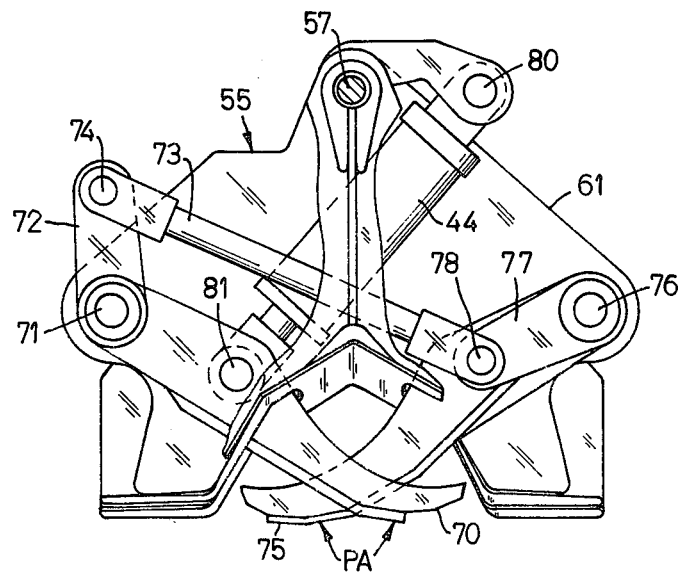
FIG. 5 is a horizontal sectional view, taken generally along line 5—5 of FIG. 4 but on an enlarged scale and showing the primary arms.
Figure 6:
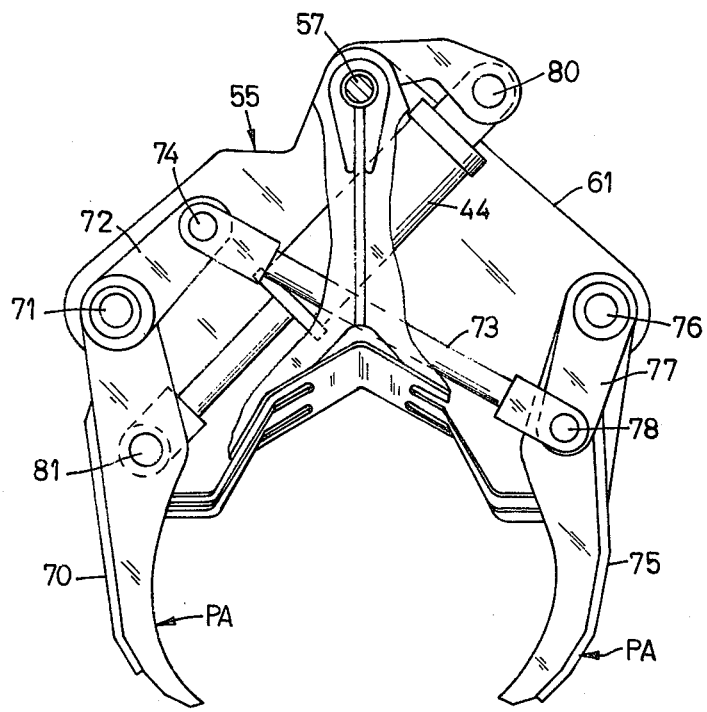
FIG. 6 is a view similar to FIG. 5 and taken on the same line 5—5 of FIG. 4, but showing the primary arms in an open position.
Figure 7:
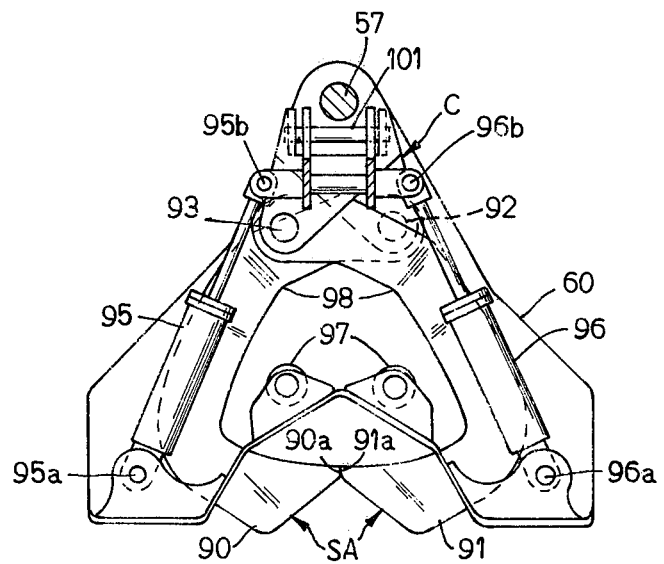
FIG. 7 is a horizontal sectional view taken generally along the line 7—7 in FIG. 4, but on an enlarged scale and showing the secondary arms in the closed position.
Figure 8:
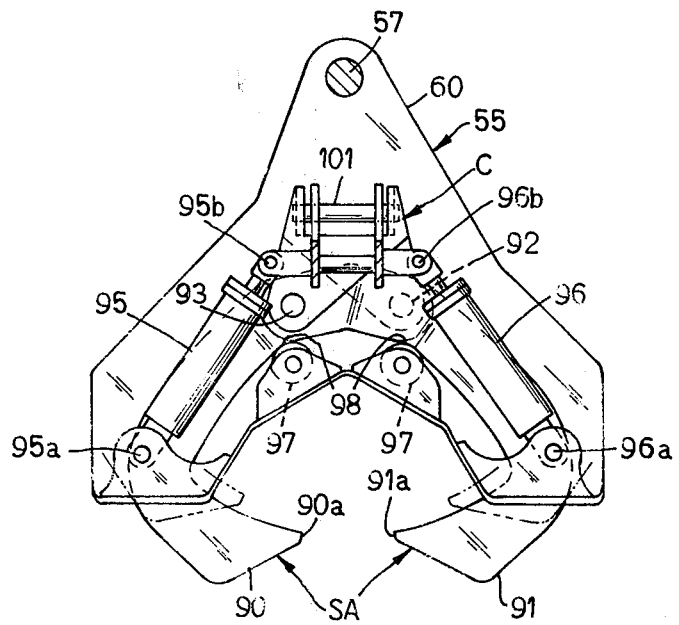
FIG. 8 is a view similar to FIG. 7, and taken on the same line 7—7 of FIG. 4, but showing the secondary arms in the open position.

Two pairs of arms are pivotally mounted on the sub-frame 55 and one of these pairs will be referred to as the primary arms PA and these are shown in greater detail in FIGS. 5 and 6, those views being taken along the line 5—5 in FIG. 4. The secondary pair of arms SA are shown in FIGS. 7 and 8.

Both pairs of arms are shown in various positions in FIGS. 10 to 15 together with the shear blades 36 and 37.

More specifically, the pair of primary arms PA include an arm 70 pivoted to the sub-frame plate 61 at 71. Arm 70 includes a crank portion 72 rigidly fixed therewith and having a tie rod 73 pivoted thereto at 74. The other arm 75 of the primary arms is pivoted to the sub-frame plate 61 at 76 and also has a crank member 77 fixed therewith. The tie rod 73 is then connected at 78 to the crank arm 77, thus tying the arms 70 and 75 together for coordinated swinging movement, as will appear.

The primary tree clamp cylinder unit 44 previously referred to, (FIGS. 4, 5 and 16) is pivoted at 80 to the sub-frame and is also pivoted at 81 to arm 70. Extension or contraction of the double acting cylinder unit 44 causes the arms to swing together to an open, tree receiving position as shown in FIG. 6 or the closed, tree holding position as shown in FIG. 5.

Figure 9:
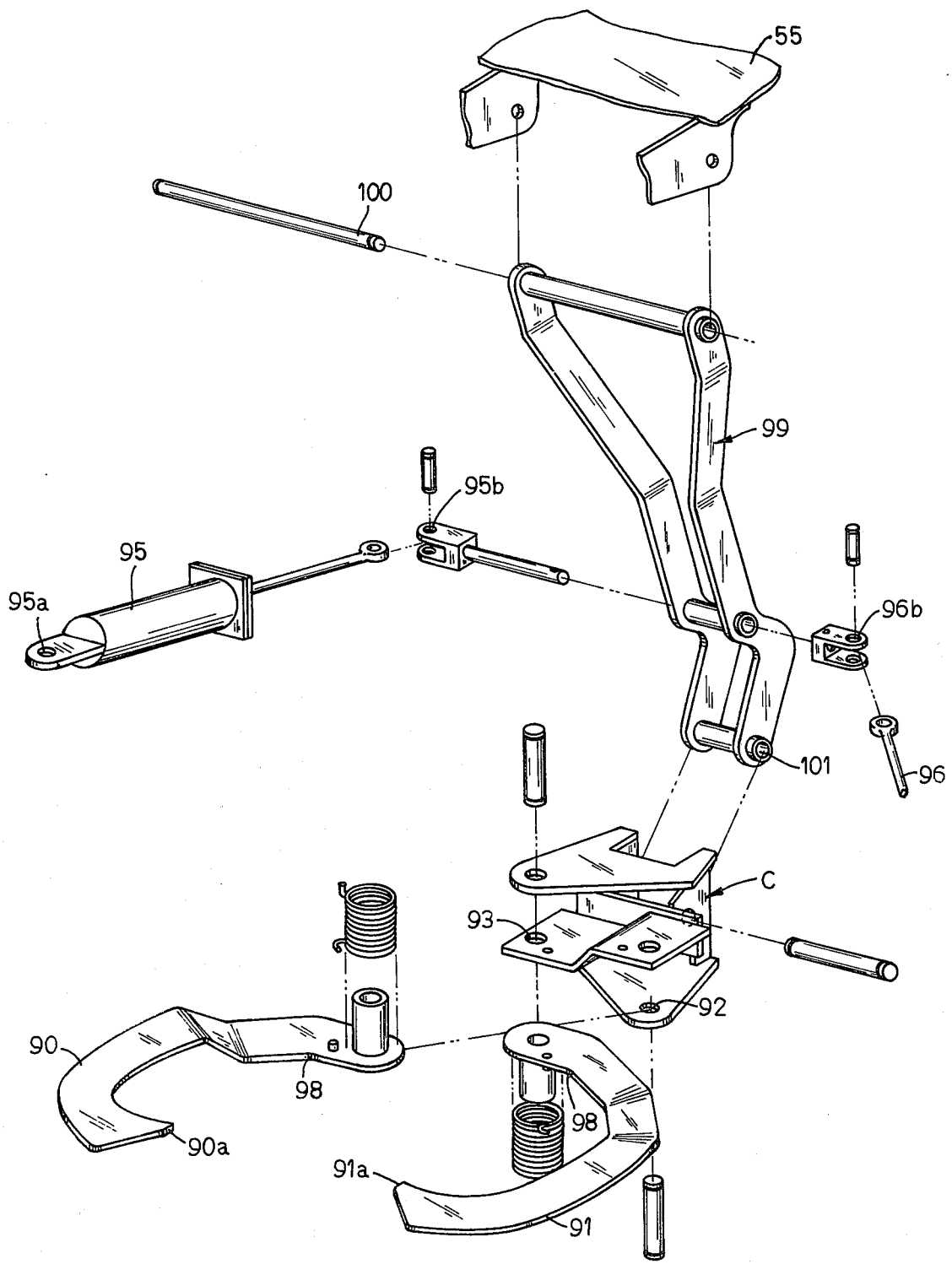
FIG. 9 is a perspective, exploded view of the actuating mechanism shown in FIGS. 7 and 8 on an enlarged scale.

Referring now to FIGS. 7, 8 and 9, the arms SA include a curved arm 90 pivoted to a horizontally shiftable carriage C at 92 and opposed arm 91 pivoted at 93 to the carriage C. The carriage is shiftable on the sub-frame 55 and is connected to a bifurated bracket 99 as at 101 and the bracket in turn is connected to the sub-frame 55 by a pivot shaft 100. A pair of double acting hydraulic cylinder units 95 and 96 are pivoted at one end to the sub-frame 55 as at 95*a* and 96*a*, respectively, and are pivoted at their other ends to the bracket 99 at 95*b* and 96*b*, respectively. A pair of rollers 97 (FIGS. 7 and 8) are fixed to the sub-frame 55 and are engaged by the cam surfaces 98 of the arms 90 and 91 when the latter have been shifted to the position shown in FIG. 8, thus forcing the arms to the open position. With this mechanism, it will be noted from FIG. 8 that the inward tips 90*a* and 91*a* of the arms move laterally apart from one another, that is, in opposite directions, and thus are withdrawn from between the accumulated trees and the subsequent tree being collected by the primary arms, as will presently appear.

The cylinder units 95 and 96 are actuated by the control valve 102 (FIG. 16) which directs fluid pressure from conduit 103 to either of the conduits 104 or 105 to thereby extend or retract the cylinder units 95 and 96 together.

Operation

Figure 10:
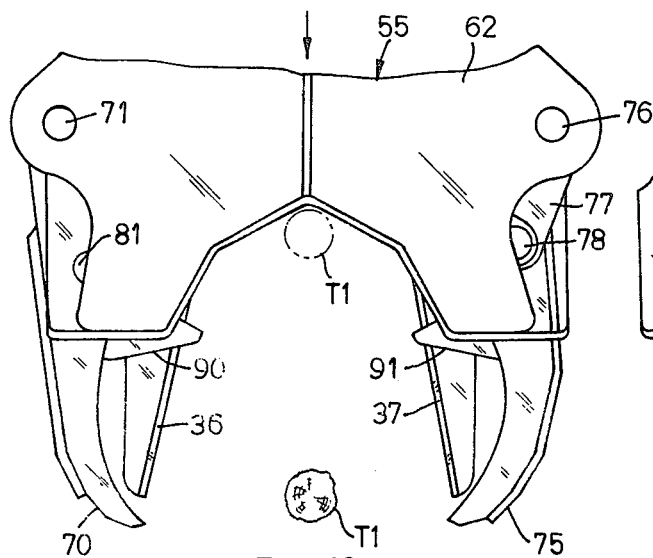
FIGS. 10-15 are enlarged, fragmentary plan views of the primary and secondary arms and showing a sequence of operation for gathering and cutting a plurality of trees.
Figure 11:
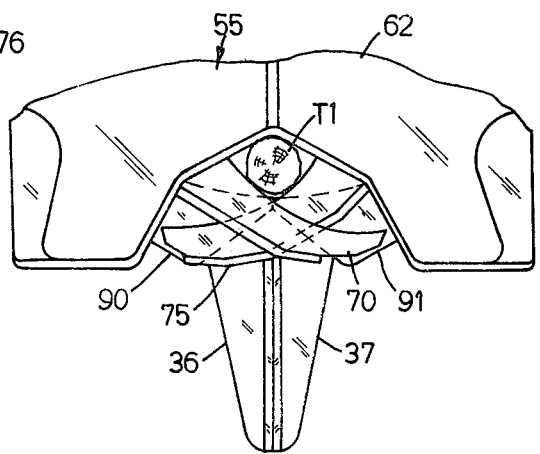

FIGS. 10 to 15 illustrate the sequential operation of the two pairs of arms when gathering and accumulating trees, one at a time. In FIG. 10, the first tree T1 is approached when the harvester moves in the direction indicated by the arrow. When the harvester has moved to a location where the tree T1 is in the dotted line position shown in FIG. 10, both pairs of arms are swung to the closed position (FIG. 11) by their respective hydraulic cylinder units, and the shear blade has also been swung to the closed cutting position.

Figure 12:
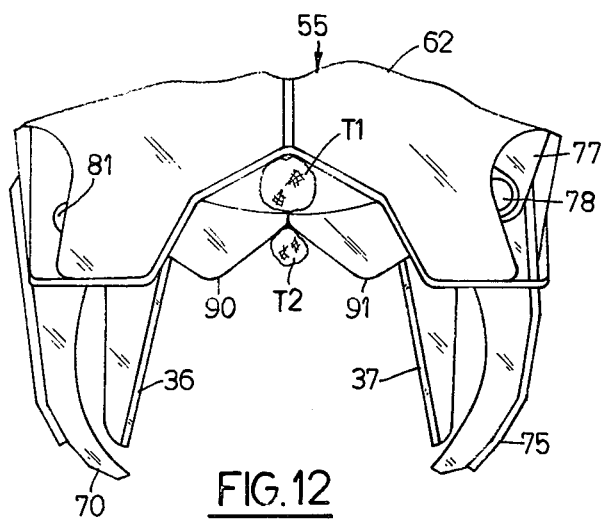

As shown in FIG. 12, the shear blades 36 and 37 have been swung to the open position as have the primary arms 70, 75 while the secondary arms 90, 91 remain in the closed position where they hold the tree T1. The harvester has been moved so as to cause a second tree T2 to abut against the outer sides of the arms 90 and 91.

Figure 13:
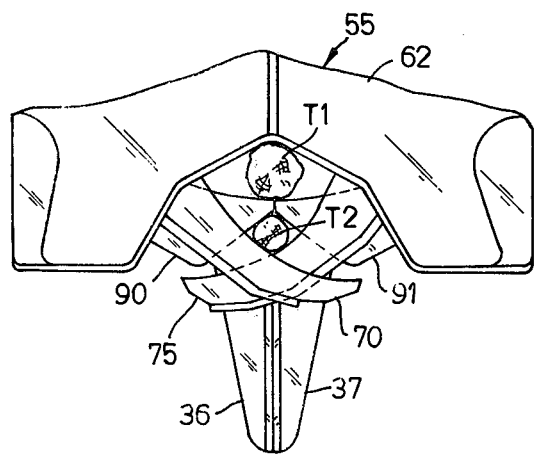

As shown in FIG. 13, the primary arms 70, 75 have then been closed around the second tree T2 and the shear blades have been actuated to sever the tree T2.

Figure 14:
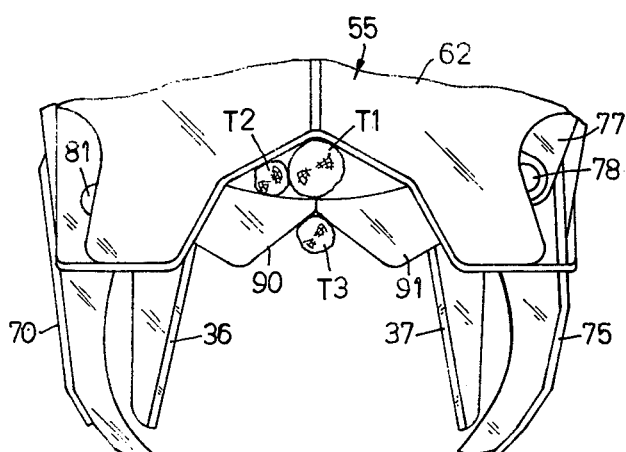

The secondary arms 90 and 91 are then opened to permit the passage of the tree T2 so that it also is engaged or clampingly held by the secondary arms 90 and 91, as shown in FIG. 14. It will be noted that the primary arms 70 and 75 have been moved to the open position, as have the shear blades 20 and 21, so that a third tree T3 can assume a position on the outer side of the secondary arms, 90 and 91 when the harvester has been moved forwardly against the tree T3.

Figure 15:
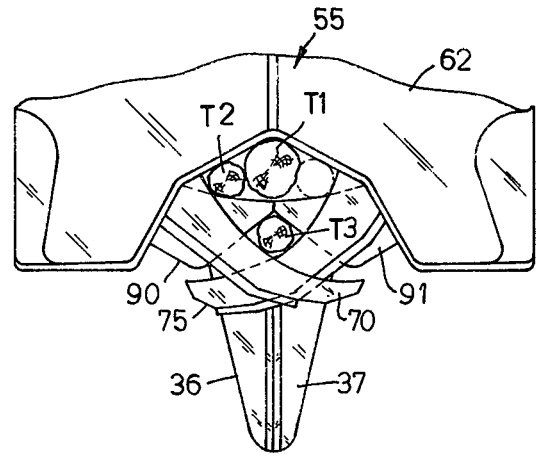

As shown in FIG. 15, the primary arms 70, 75 are then moved to the closed position, where they clamp the tree T3 against the outside of the secondary arms 90 and 91.

At this stage, the secondary arms are again opened so as to be withdrawn in generally laterally opposite directions to permit the third tree T3 to assume a position in accumulated relationship with the other trees within the closed primary arms 70, 71.

The above procedure can be repeated until the holding capacity of the secondary arms has been reached.

With the present invention, a multiplicity of trees can be harvested, one at a time, while the previously accumulated trees are securely held. One pair of arms acts to hold the accumulated trees and can be open or withdrawn generally laterally so as to permit the entry of an additional tree due to the clamping action of the primary arms. The secondary arms then act to clamp the additional tree as well as the previously accumulated trees while the primary arms are free to gather still another tree.

We claim:

1. A multiple tree harvester for cutting and accumulating trees, one at a time, said harvester having a support frame, a primary pair of arms and a secondary pair of arms movably mounted on said support frame for cooperating to gather a plurality of trees, one at a time, said pairs of arms being vertically spaced on said support and from one another; said pairs of arms being shiftable between an open, tree receiving position and a closed, tree holding position; power means attached to each of said pairs of arms and for selectively moving each of said pairs of arms between their open tree receiving position and their closed, tree holding position, and power operated tree severing means located generally below said arms for severing said trees which are to be accumulated.

2. The harvester set forth in claim 1 further characterized in that said power means includes a hydraulically operated cylinder unit for each of said pairs of arms, and control means for individually and selectively operating each of said hydraulically operated cylinder units.

3. The harvester set forth in claim 1 wherein the power means for one of said pairs of arms is operative to hold its arms in said closed position to thereby hold a first tree, said power means for said other set of arms then being operative to open its arms to said tree receiving position and shift its arms to embrace and clamp a second tree against said one pair of arms, and then said power means for said one pair of arms is operative to shift its arms in a generally sideways position from between said first and second trees and to its said open position, whereby said power means for said other pair of arms can cause the latter to clampingly engage both of said trees.

4. The harvester set forth in claim 2 wherein the power means for one of said pairs of arms is operative to hold its arms in said closed position to thereby hold a first tree, said power means for said other set of arms then being operative to open its arms to said tree receiving position and shift its arms to embrace and clamp a second tree against said one pair of arms, and then said power means for said one pair of arms is operative to shift its arms in a generally sideways position from between said first and second trees and to its said open position, whereby said power means for said other pair of arms can cause the latter to clampingly engage both of said trees.

5. The harvester set forth in claim 1 including an arm carrying carriage movably mounted on said support frame, one of said pairs of arms being pivotally mounted on said carriage, said power means for said one of said pairs of arms being connected between said support frame and said carriage to move the latter along with said one pair of arms, the arms of said one of said pairs of arms being generally of U-shape when viewed in plan and having laterally extending free ends and also having a cam surface, said cam surfaces abuttable against stop means on said support frame when said carriage is moved to an arm open position whereby the arm free ends move generally laterally apart from one another.

6. A mobile self-propelled multiple tree harvester for cutting and accumulating trees, one at a time, said harvester having a chassis, a power operated boom pivotally mounted on said chassis and having a free end for vertical and horizontal swinging relative to said chassis, a support frame pivotally mounted on said free end, a primary pair of arms and a secondary pair of arms movably mounted on said support frame for cooperating to gather a plurality of trees, one at a time, said pairs of arms being vertically spaced on said support and from one another; said pairs of arms being movable between an open, tree receiving position and a closed, tree position; power means attached to each of said pairs of arms and for selectively moving each of said pairs of arms between their open tree receiving position and their closed, tree holding position, and power operated tree severing means located on and adjacent the lower end of said support frame for severing trees.

7. The harvester set forth in claim 6 further characterized in that said power means includes a hydraulically operated cylinder unit for each of said pairs of arms, and control means for individually and selectively operating each of said hydraulically operated cylinder units.

8. The harvester set forth in claim 6 wherein the power means for one of said pairs of arms is operative to hold its arms in said closed position to thereby hold a first tree, said power means for said other set of arms then being operative to open its arms to said tree receiving position and move its arms to embrace and clamp a second tree against said one pair of arms, and then said power means for said one pair of arms is operative to move its arms in a generally sideways position from between said first and second trees and to its said open position, whereby said power means for said other pair of arms can cause the latter to clampingly engage both of said trees.

9. The mobile tree harvester as described in claim 6 including a processing tower and a log storage means mounted on said chassis, said power operated boom being swingable to deliver said accumulated trees to said processing tower.

10. The mobile tree harvester as described in claim 8 including a processing tower and a log storage means mounted on said chassis, said power operated boom being swingable to deliver said accumulated trees to said processing tower.

11. The harvester set forth in claim 5 including an arm carrying carriage movably mounted on said support frame, one of said pairs of arms being movably mounted on said carriage, said power means for said one of said pairs of arms being connected between said support frame and said carriage to move the latter along with said one pair of arms, the arms of said one of said pairs of arms being generally of U-shape when viewed in plan and having laterally extending free ends and also having a cam surface, said cam surfaces abuttable against stop means on said support frame when said carriage is moved to an arm open position whereby the arm free ends move generally laterally apart from one another.

12. The mobile tree harvester as described in claim 11 including a processing tower and a log storage means mounted on said chassis, said power operated boom being swingable to deliver said accumulated trees to said processing tower.

13. A mobile self-propelled multiple tree harvester for cutting and accumulating trees, one at a time, said harvester having a chassis, a power operated boom pivotally mounted on said chassis and having a free end for vertical and horizontal swinging relative to said chassis, a support frame pivotally mounted on said free end, a primary individually of arms and a secondary pair of arms movably mounted on said support frame for cooperating to gather a plurality of trees, one at a time, said pairs of arms being vertically spaced on said support and from one another; said pairs of arms being movable between an open, tree receiving position and a closed, tree holding position; a double acting hydraulically operated cylinder unit attached to each of said pairs of arms and for selectively moving each of said pairs of arms between their open tree receiving position and their closed, tree holding position, flow control means for individuall and selectively operating each of said cylinder units, and power operated tree severing means located on and adjacent the lower end of said support frame for severing trees; said cylinder unit for one of said pairs of arms being operative to hold its arms in said closed position to thereby hold a first tree, said cylinder unit for said other set of arms then being operative to open its arms to said tree receiving position and move its arms to embrace and clamp a second tree against said one pair of arms, and then said cylinder unit for said one pair of arms being operative to move its arms in generally laterally opposite directions from between said first and second trees and to its said open position, whereby said cylinder unit for said other pair of arms can cause the latter to clampingly engage both of said trees.

14. The mobile tree harvester as described in claim 13 including a processing tower and a log storage means mounted on said chassis, said power operated boom being swingable to deliver said accumulated trees to said processing tower.

15. Mechanism for a multiple tree harvester and for accumulating trees, one at a time, said mechanism including a support frame, a primary pair of arms and a secondary pair of arms movably mounted on said support frame for cooperating to gather a plurality of trees, one at a time, said pairs of arms being vertically spaced on said support and from one another; said pairs of arms being movable between an open, tree receiving position and a closed tree holding position; and power means attached to each of said pairs of arms and for selectively moving each of said pairs of arms between their open tree receiving position and their closed, tree holding position.

16. The mechanism set forth in claim 15 further characterized in that said power means includes a hydraulically operated cylinder unit for each of said pairs of arms, and control means for individually and selectively operating each of said hydraulically operated cylinder units.

17. The mechanism of claim 15 including power operated tree severing means located on and adjacent the lower end of said support frame for severing said trees which are to be accumulated.

18. The mechanism of claim 16 including power operated tree severing means located on and adjacent the lower end of said support frame for severing said trees which are to be accumulated.

19. A method of harvesting a plurality of spaced standing trees comprising the steps of encircling and tightly gripping a first standing tree with a first pair of movable arms, severing said first tree from the ground, encircling a second tree with a second pair of arms and urging said second tree tightly against the outside of said first pair of arms whereby said first pair of arms is located between said first and second trees and severing said second tree from the ground, withdrawing the arms of said first pair of arms in generally laterally opposite directions and from between said trees and continuing to encircle and tightly clamp both of said trees with said second pair of arms.

* * * * *